United States Patent [19]

Desta

[11] Patent Number: 5,127,480
[45] Date of Patent: Jul. 7, 1992

[54] REVERSIBLE PLOW

[76] Inventor: H. M. Tedla Desta, 307 Yoakum Pkwy., #808, Alexandria, Va. 22304

[21] Appl. No.: 634,703

[22] Filed: Dec. 27, 1990

[51] Int. Cl.$^5$ .................................. A01B 3/16
[52] U.S. Cl. ........................ 172/218; 172/224; 172/739
[58] Field of Search ............. 172/204, 218, 224, 225, 172/166, 161, 351, 332, 345, 364, 686, 737, 739

[56] References Cited

U.S. PATENT DOCUMENTS

| 90,895 | 6/1869 | Tyler ........................ 172/161 X |
| 159,905 | 2/1875 | Cox . |
| 168,840 | 10/1875 | Lyons ........................ 172/708 |
| 178,815 | 6/1876 | Towers . |
| 291,503 | 1/1884 | Gates ........................ 172/161 X |
| 490,276 | 1/1893 | English . |
| 759,965 | 5/1904 | Brown . |
| 765,106 | 7/1904 | Simms . |
| 803,549 | 11/1905 | Burnett . |
| 1,014,265 | 1/1912 | Sramek ........................ 172/224 |
| 1,021,117 | 3/1912 | Van Egeren ............... 172/218 X |
| 1,094,791 | 4/1914 | James . |
| 1,105,264 | 7/1914 | Floyd . |
| 1,157,399 | 10/1915 | Kimbell . |
| 1,456,647 | 5/1923 | Pannell . |
| 1,517,086 | 11/1924 | Mattice ........................ 172/161 X |
| 1,749,277 | 3/1930 | Figueras ........................ 172/218 |
| 2,486,442 | 11/1949 | Silver ........................ 172/144 X |
| 2,908,338 | 10/1959 | Hanrahan ........................ 172/166 X |
| 3,061,018 | 10/1962 | Olson ........................ 172/144 X |
| 3,550,691 | 12/1970 | Davies et al. ................. 172/734 X |
| 3,752,238 | 8/1973 | Chilton ........................ 172/166 X |

FOREIGN PATENT DOCUMENTS

| 38273 | 3/1909 | Austria ........................ 172/224 |
| 529537 | 6/1954 | Belgium ........................ 172/224 |
| 103782 | 6/1874 | France ........................ 172/224 |
| 1006493 | 4/1952 | France ........................ 172/224 |
| 1155696 | 5/1958 | France ........................ 172/224 |

Primary Examiner—Randolph A. Reese
Assistant Examiner—Jeffery L. Thompson
Attorney, Agent, or Firm—Nies, Kurz, Bergert & Tamburro

[57] ABSTRACT

A rotatable plow that includes a pair of oppositely disposed plow members carried on a plow carrier pivotally carried by a draft beam. The draft beam includes a plow carrier adjustment yoke for changing the angular orientation of the plow frame relative to the ground, and thereby also the plow members. A locking arrangement is provided to permit the plow frame to be locked in a predetermined position to selectively present one of a first and a second second plow and moldboard assembly for conducting plowing operations.

9 Claims, 2 Drawing Sheets

REVERSIBLE PLOW

BACKGROUND OF THE INVENTION

1. Field of the Invention

The present invention relates to a reversible plow that can be pivotally shifted to selectively provide furrows that have the loosened earth deposited on either the right side or the left side of the center of the furrow. More particularly, the invention relates to a reversible plow that is vertically adjustable, relative to the plow draw beam, to permit variation of the angle that the plow structure makes relative to the ground, in order to selectively permit deep, medium deep, normal, and shallow plow depths.

2. Description of the Related Art

Various types of reversible plow structures have been developed over the years. Two examples of such structures are shown in U.S. Pat. No. 90,895, which issued Jun. 1, 1869, to W. H. Tyler, and in U.S. Pat. No. 291,503, which issued Jan. 4, 1884, to H. Gates. Each of the Tyler and Gates patents shows a reversible plow in which the reversible plow support structure is fixed in position relative to the draw beam, and the pivot axis of the plow remains fixed in a substantially horizontal position. Consequently, control of the depth of the plowing operation is achieved by upward or downward pressure applied to the plow handles by the operator.

Structures for permitting changing the angle of the plow structure relative to the plow draw beam are shown in U.S. Pat. No. 490,276, which issued Jan. 24, 1893, to D. B. English; U.S. Pat. No. 1,105,264, which issued Jul. 28, 1914, to D. H. Floyd; and U.S. Pat. No. 1,157,399, which issued Oct. 19, 1915, to W. A. Kimbell.

Although patents directed to plow structures have issued since the mid-19th century, it is believed that the combination of a reversible plow with plow support structure to permit selective vertical adjustment of the plow angle relative to the ground, is novel. Such a structural arrangement is highly advantageous in that the ability to vertically adjust the plow to change the angle at which the plow passes through the earth permits the plow orientation to be adapted to the extent of compaction and density of the soil, thereby providing a more versatile plow.

It is therefore an object of the present invention to overcome the shortcomings of the prior art structures and to provide an improved plow that provides in a unitary structure both reversible operation as well as vertical adjustment.

SUMMARY OF THE INVENTION

Briefly stated, in accordance with one aspect of the present invention, a reversible plow is provided that is carried by a plow beam having a beam longitudinal axis, the beam connected with a suitable traction means for pulling the plow, which normally would be one or more draft animals. The plow includes a plow frame, and a plow assembly having a pair of first and second plow share and mold board assemblies pivotally carried on a plow pivot axis extending from and supported by the frame. The pivotal arrangement of the plow share and mold board assemblies permits selective presentation in an operative position of one of the first and second plow share assemblies, as selected by the operator.

A pivoting means is provided for pivoting the plow share and mold board assemblies about the pivot axis, and stop means are carried by the plow frame for limiting pivotal movement of the plow share and mold board assemblies between first and second positions that are substantially 180° apart.

The plow frame is connected with the plow beam by a connecting means that includes a plow frame pivot axis positioned above the beam longitudinal axis and extending in a generally horizontal direction. A plow frame positioning means is positioned above the beam longitudinal axis and forwardly of the plow frame pivot axis for positioning the plow frame at one of a plurality of positions above the plow beam, the positioning means permitting the forward end of the plow frame to be secured at a desired position above the plow beam to vary the angle and depth of penetration of the plow share relative to the ground, and thereby the depth of the resulting furrow.

DESCRIPTION OF THE PREFERRED EMBODIMENTS

Figure 1:
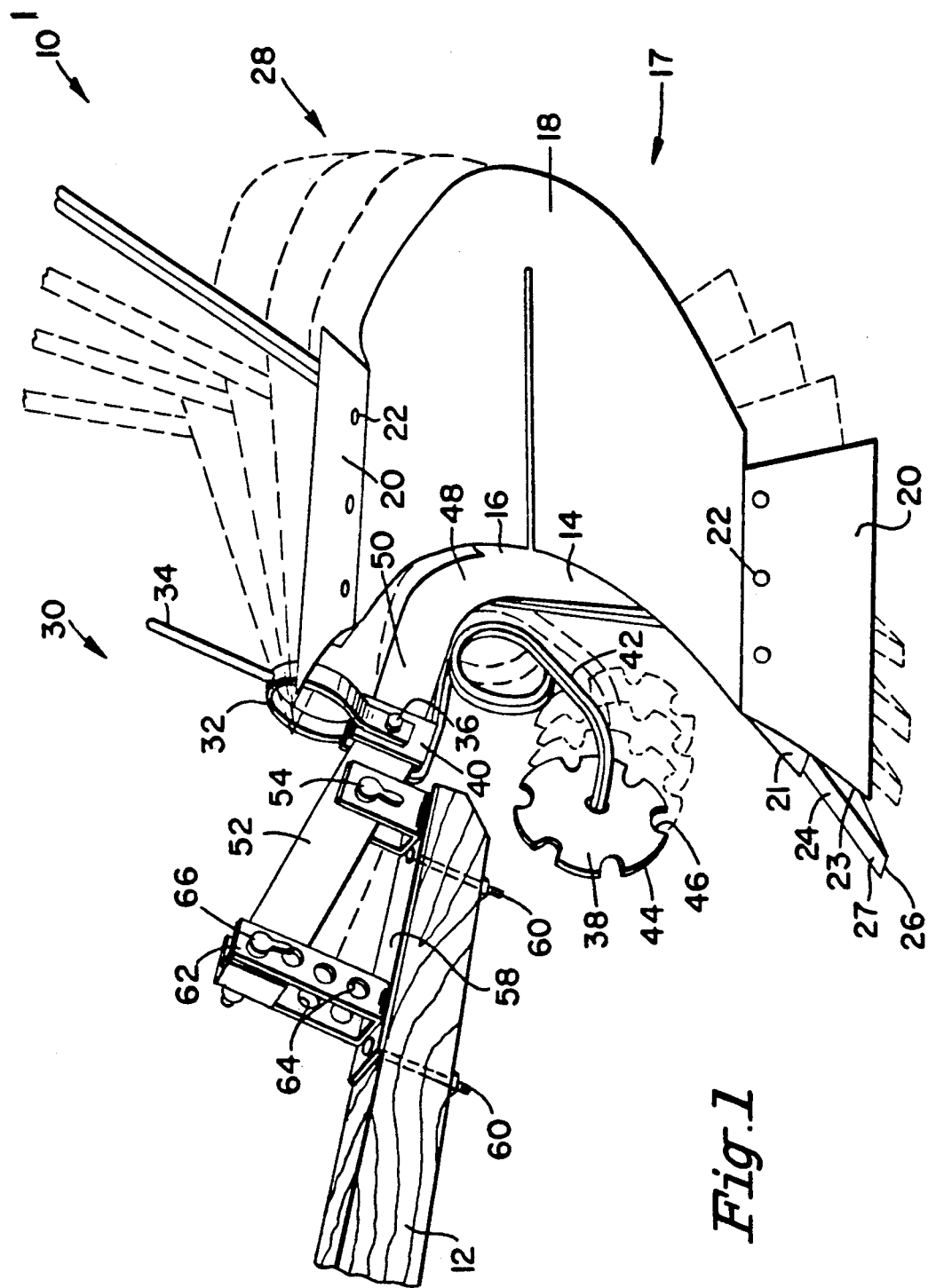
FIG. 1 is a side perspective view of a reversible plow in accordance with the present invention, showing in dashed lines the several positions at which the plow can be oriented relative to the beam.

Referring now to the drawings, and particularly to FIG. 1 thereof, there is shown a plow 10 that is connected with a plow draw beam 12, only a portion of which is shown in the drawings. As will be appreciated by those skilled in the art, the beam extends in a forward direction to a yoke (not shown) or the like, to permit draw beam 12 to be carried by one or more draft animals (not shown) that provide the pulling power for drawing the plow through the soil.

Plow 10 is a reversible structure that is pivotally carried by a plow frame 14, which includes a sharpened forward edge to cut through sod and earth, and which also includes a plow pivot axis 16 that extends in a rearward direction relative to draw beam 12. Pivot axis 16 supports a first plow assembly 17 that includes a moldboard 18 that is curved in order to cause loosened earth or sod to be lifted and turned over the adjacent earth during the plowing operation. Moldboard 18 extends upwardly and downwardly from pivot axis 16 and is connected to and terminates in a pair of spaced plow shares 20, such as by means of bolts 22, or the like. Plow shares 20 each include a lip 21 that extends forward of plow share edge 23, and is bent inwardly, to deflect any grass from sod that tends to creep along edge 23, to prevent formation of a gap between moldboard 18 and plow frame 14, and also reduce the drag that would otherwise be imposed by any grass or sod that tends to collect there.

Adjacent the lowermost plow share 20 is positioned a penetrator 24 that is carried in a penetrator sleeve 25 (see FIG. 2) that is welded to plow frame 14. Penetrator 24 includes a forwardly extending pointed end 26 for penetrating the earth to facilitate the plowing operation. Additionally, penetrator 24 also includes an upwardly facing surface 27 that is inclined to the longitudinal axis of the penetrator to cause a downwardly directed force to be continuously applied to penetrator 24 as it is drawn through the earth, to keep the penetrator from riding upwardly during a plowing operation.

Positioned on the opposite side of plow pivot axis 16 from first plow assembly 17 is a second plow assembly 28 that is similarly structured and configured. However, plow assembly 28 is adapted to deposit the earth and sod on the right side of the plow structure during plowing operations, whereas first plow assembly 17 is adapted to deposit the earth and sod on the left side of the plow structure during plowing operations.

A stop means 30 is carried on and extends upwardly from plow frame 14 for limiting rotational movement of plow assemblies 17 and 28 relative to plow frame 14. As shown in FIG. 1, stop means 30 includes a stop ring 32 and an upwardly extending stop arm 34, the stop ring and arm being adapted to be pivoted as an assembly about a substantially horizontally extending pivot axis defined by stop ring connecting bolt 36 that passes through both a lateral extension forming part of stop ring 32 and an aperture (not shown) in plow frame 14.

A coulter 38 is provided at a point forward of plow pivot axis 16 and below stop means 30. Coulter 38 is carried by plow frame 14 and is secured thereto by means of a coulter clamp 40, which is connected to plow frame 14 by bolt 36. Coulter 38 is a wheel that is rotatably carried by coulter spring 42 and includes a plurality of spaced, sharpened peripheral edges 44 and a series of intermediate scalloped recesses 46 which permit edges 44 to cut into the earth ahead of the plow, as will be appreciated by those skilled in the art.

Plow frame 14 includes a curved section 48 extending from pivot axis 16 in a generally forward direction, a first linear portion 50 extending forwardly of curved portion 48, and a second linear portion 52 extending forwardly of first linear portion 50. Linear portions 50 and 52 are not coaxial and their longitudinal axes are positioned to define an included angle of about 175°. Adjacent the rearmost end of linear portion 52 is an aperture (not shown) through which a carrier pivot pin 54 extends to define a generally horizontal pivot axis about which plow frame 14 is pivotable. Carrier pivot pin 54 is spaced above the upper surface of draw beam 12 and is carried in a U-shaped pivot support 56 that includes a pair of horizontally opposed openings (not shown) to receive carrier pivot pin 54. Support 56 is secured to a base plate 58, such as by welding, and base plate 58 is, in turn, secured to draw beam 12, such as by bolts 60, or the like.

Positioned on base plate 58 forwardly of carrier pivot pin 54 is adjustment support 62, which is also a U-shaped member that is secured to base plate 58, such as by welding. Adjustment support 62 includes a pair of spaced, parallel legs that extend generally vertically, relative to draw beam 12, and that each include respective pairs of opposed openings 64 to receive a carrier position bolt 66. As shown, four such openings 64 are provided in each leg of adjustment support 62, although more or fewer such openings can be provided, if desired. The purpose of the several openings 64 in adjustment support 62 is to permit vertical adjustment of plow 10, relative to draw beam 12, as will be hereinafter described in greater detail.

Figure 2:
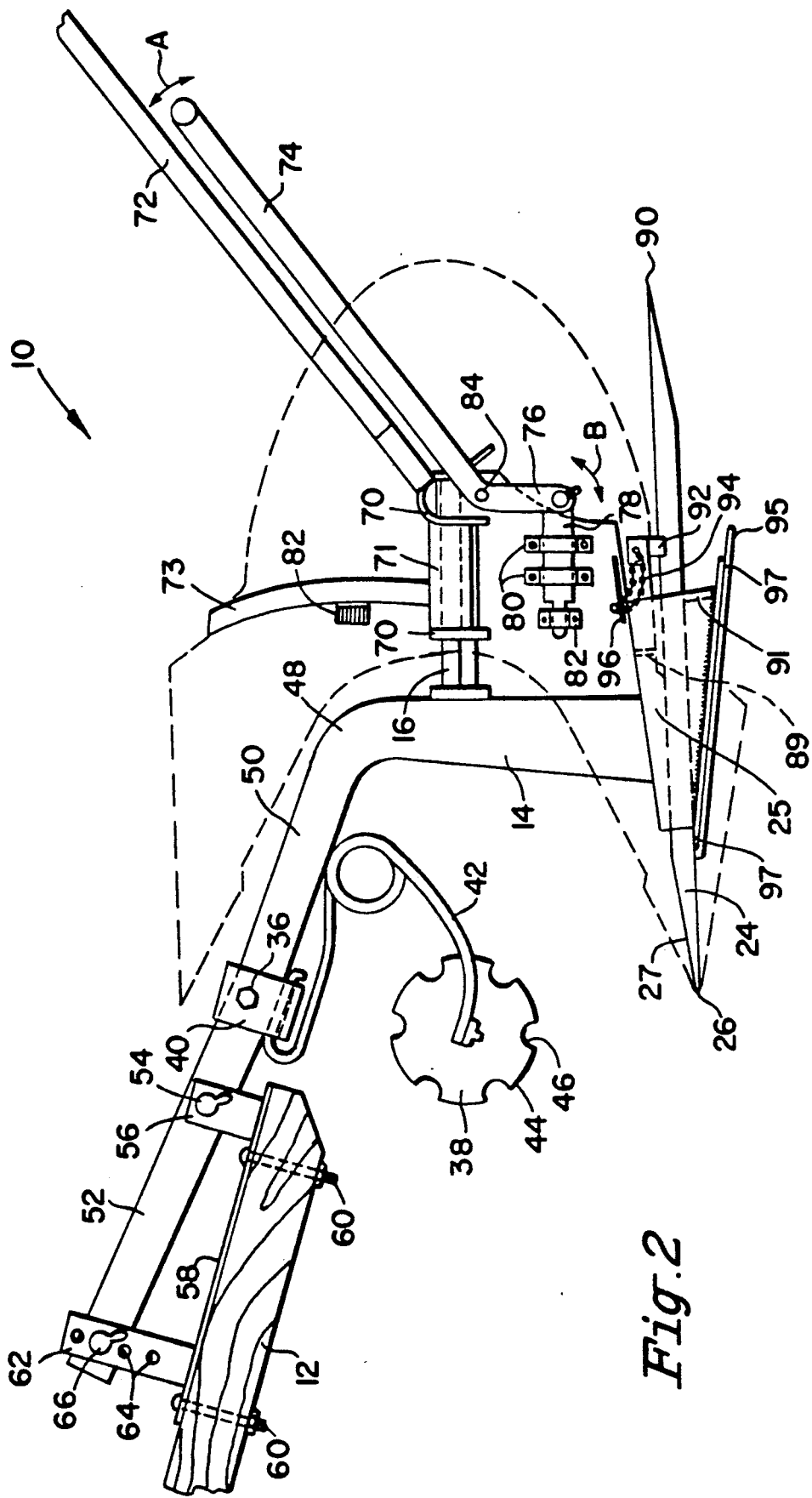
FIG. 2 is a side view of the plow shown in FIG. 1, after the plow has been rotated 180° and with the plow shares and mold boards shown in dashed lines.

Referring now to FIG. 2, plow pivot axis 16 includes a pair of spaced saddles 70 that are positioned on either side of a sleeve 71 that is secured to moldboard support rib 73 and that permits plow 10 to pivot about pivot axis 16. Support rib 73 is positioned on the outside surface of the moldboard and extends between the respective plow shares 20.

Extending from pivot axis 16 in a generally upward and rearward direction is a handle arrangement 72. Pivot axis 16 also carries a pivotable locking bar 74 that extends substantially parallel with handle 72. Locking bar 74 includes a leg 76 that extends in a generally downward direction to pivotally support a lock bolt 78 that is slidably received in a pair of lock bolt guide channels 80 and a locking clip 82.

Locking bar 74 is pivotable about a locking bar pivot axis 84, and when locking bar 74 is moved in an upward direction shown by arrow A, leg 76 causes lock bolt 78 to be drawn in a rearward direction as generally illustrated by arrow B. When lock bolt 78 is fully withdrawn from locking clip 82 rearwardly to the forwardmost of guide channels 80, plow 10 can be pivoted about plow pivot axis 16 to present the opposite plow share and moldboard structure 28 for the next plowing operation.

As also seen in FIG. 2, penetrator 24 is slidably carried in a penetrator housing 25, to permit penetrator 24 to be removably carried by the plow structure. As shown, penetrator 24 includes forwardly facing pointed end 26 and also a rearwardly facing pointed end 90.

Housing 25 is a tapered structure having a narrowed forward end to slidably receive penetrator 24, and a diverging rearward end. Adjacent the rearward end of housing 25 and offset from each other are a pair of penetrator support plates 89 and 91 that extend inwardly toward the penetrator to contact the upper and lower surfaces, respectively, of penetrator 24. Preferably, support plates 89 and 91 are not secured along each of their edges to penetrator housing 25 so that they have a slight amount of flexibility to permit penetrator 24 to be securely gripped.

A wedge member 92 is provided to fit between the upper surface of penetrator 24 and the lowermost edge of support plate 89 to securely retain the penetrator in position. A retaining chain 94 extends from wedge member 92 and is connected with a retaining link 96 carried by plow frame 14. Consequently, the penetrator can be removed and reinserted in the opposite direction to present a new penetrator tip when the original one becomes dull.

Penetrator housing 25 includes a lower surface that carries a sole plate 95 that is riveted to housing 25 by rivets 97. When sole plate 95 is eroded away by the earth, rivets 97 can be removed to permit a new sole plate to be attached.

The plow is operable in the usual manner, except that the vertical adjustment of the plow body 10 can be changed by selecting the desired positioning openings 64 in adjustment support 62. Preferably, openings 64 on each side of adjustment support 62 are spaced from each other to provide carrier beam angles between second linear portion 52 and draw beam 12 of from about 21° to about 34°. By virtue of the adjustment provided, the angular orientation of the plow body relative to the ground can change, to selectively provide four plowing depths: deep, medium deep, normal, and shallow. However, regardless of the angular position of second linear portion 52, the pulling line of the plow beam is maintained constant and is substantially centered relative to the center of the moldboard, which is always the center of load, whether plowing deep or shallow. By maintaining the pulling power line of the draft beam constant, there is little or no change in the power demand, regardless of the angular orientation of the plow.

It can therefore be seen that the present invention provides distinct advantages over the prior art plow structures.

Although particular embodiments of the present invention have been illustrated and described, it will be apparent to those skilled in the art that various changes and modifications can be made without departing from the spirit of the present invention. It is therefore intended to encompass within the appended claims all such changes and modifications.

What is claimed is:

1. A reversible plow carried by a plow beam having a beam longitudinal axis, the beam connected with a suitable traction means for pulling the plow, said plow comprising:
   a. a plow frame;
   b. a plow assembly including first and second plow share and moldboard assemblies pivotally carried on a plow pivot axis extending from the plow frame to permit selective presentation in an operative position of one of the first and second plow share and moldboard assemblies;
   c. pivoting means for pivoting the plow share and moldboard assemblies about the pivot axis between a first position in which the first plow share and moldboard assembly is in an operative position and a second position in which the second plow share and moldboard assembly is in an operative position, wherein the first and second positions are spaced from each other;
   d. stop means carried by the plow frame for limiting pivotal movement of the plow share and moldboard assemblies between said first and second positions; and
   e. plow frame support means carried by the plow beam for pivotally supporting the plow frame from the plow beam, the plow frame support means including a plow frame pivot axis positioned above the beam longitudinal axis and extending in a generally horizontal direction, and a plow frame retaining means carried by the plow beam and positioned above the beam longitudinal axis and spaced forwardly of the plow frame pivot axis for retaining a portion of the plow frame at one of a plurality of pivotal positions above the plow beam, the retaining means permitting the forward end of the plow frame to be supported at a desired angular position above the plow beam to vary the depth of penetrating of the plow share and thereby the depth of the resulting furrow.

2. A reversible plow in accordance with claim 1, including a rotatable coulter carried by the plow frame and positioned forwardly of the plow assembly.

3. A reversible plow in accordance with claim 2 wherein the coulter is rotatably carried on a spring means extending from the plow frame.

4. A reversible plow in accordance with claim 1, wherein the plow frame support means includes a plurality of positioning apertures to permit the plow share and moldboard assemblies to be positioned at different angular positions relative to the ground.

5. A reversible plow in accordance with claim 4, wherein the plow frame support means includes a yoke having pairs of opposed apertures to support the plow frame at a predetermined angle relative to the ground and to limit lateral movement of the plow frame relative to the plow beam.

6. A reversible plow in accordance with claim 1, including a penetrator removably carried by the plow assembly, and retention means for retaining the penetrator in position.

7. A reversible plow in accordance with claim 1, including locking means for locking the plow in one of the first or second positions to prevent rotation about the plow pivot axis.

8. A reversible plow in accordance with claim 7 said locking means including a locking bar extending rearwardly and pivotally carried by the plow frame for pivotal movement in a fore-and-aft direction.

9. A reversible plow in accordance with claim 8, said locking means including locking channels carried by each moldboard to slidably receive the locking bar.

* * * * *